United States Patent
Yamada et al.

(10) Patent No.: US 8,792,838 B2
(45) Date of Patent: Jul. 29, 2014

(54) RADIO COMMUNICATION APPARATUS, RADIO COMMUNICATION METHOD, AND NON-TRANSITORY COMPUTER READABLE MEDIUM STORING RADIO COMMUNICATION CONTROL PROGRAM

(75) Inventors: Masaaki Yamada, Tokyo (JP); Mitsuhiro Kitani, Tokyo (JP)

(73) Assignee: NEC Casio Mobile Communications, Ltd., Kanagawa (JP)

( * ) Notice: Subject to any disclaimer, the term of this patent is extended or adjusted under 35 U.S.C. 154(b) by 680 days.

(21) Appl. No.: 12/916,867

(22) Filed: Nov. 1, 2010

(65) Prior Publication Data
US 2011/0105049 A1 May 5, 2011

(30) Foreign Application Priority Data
Nov. 4, 2009 (JP) ................................. 2009-253257

(51) Int. Cl.
H04B 7/02 (2006.01)
H04B 1/06 (2006.01)
H04B 7/08 (2006.01)
H04B 7/06 (2006.01)
H04B 7/10 (2006.01)

(52) U.S. Cl.
CPC ............... H04B 7/08 (2013.01); H04B 7/0874 (2013.01); H04B 7/0697 (2013.01); H04B 7/10 (2013.01)
USPC .......................... 455/101; 455/273; 455/277.2

(58) Field of Classification Search
USPC ........ 455/562.1, 101, 103, 272, 277.1, 277.2, 455/65; 375/299, 347
See application file for complete search history.

(56) References Cited

U.S. PATENT DOCUMENTS

| | | | |
|---|---|---|---|
| 2001/0039198 A1* | 11/2001 | Onishi et al. | 455/562 |
| 2002/0132600 A1* | 9/2002 | Rudrapatna | 455/277.1 |
| 2006/0084461 A1* | 4/2006 | Sekiya et al. | 455/522 |
| 2007/0087701 A1* | 4/2007 | Kobayashi et al. | 455/101 |
| 2009/0111533 A1* | 4/2009 | Johansson et al. | 455/575.1 |
| 2010/0041355 A1* | 2/2010 | Laroia et al. | 455/129 |
| 2010/0056234 A1* | 3/2010 | Yamamoto et al. | 455/575.7 |

FOREIGN PATENT DOCUMENTS

| | | |
|---|---|---|
| JP | 2004-289407 | 10/2004 |
| JP | 2004-304760 | 10/2004 |
| JP | 2004-312381 | 11/2004 |
| JP | 2005-223802 | 8/2005 |
| JP | 2005-252825 | 9/2005 |
| JP | 2005-303856 | 10/2005 |
| JP | 2006-180320 | 7/2006 |
| JP | 2007-043749 | 2/2007 |
| JP | 2007-116454 | 5/2007 |
| JP | 2007-214759 | 8/2007 |
| JP | 2008-166855 | 7/2008 |
| JP | 2009-141470 | 6/2009 |

OTHER PUBLICATIONS

JP Office Action dated May 7, 2013, with partial English translation; Application No. 2009-253257.
JP Office Action dated Jan. 7, 2014, with English Translation; Application No. 2009-253257.

* cited by examiner

*Primary Examiner* — Nguyen Vo
(74) *Attorney, Agent, or Firm* — Young & Thompson

(57) ABSTRACT

A combination of antennas to be used is selected based on a distance between a plurality of antennas or the polarization direction of a radio signal to be transmitted/received.

13 Claims, 12 Drawing Sheets

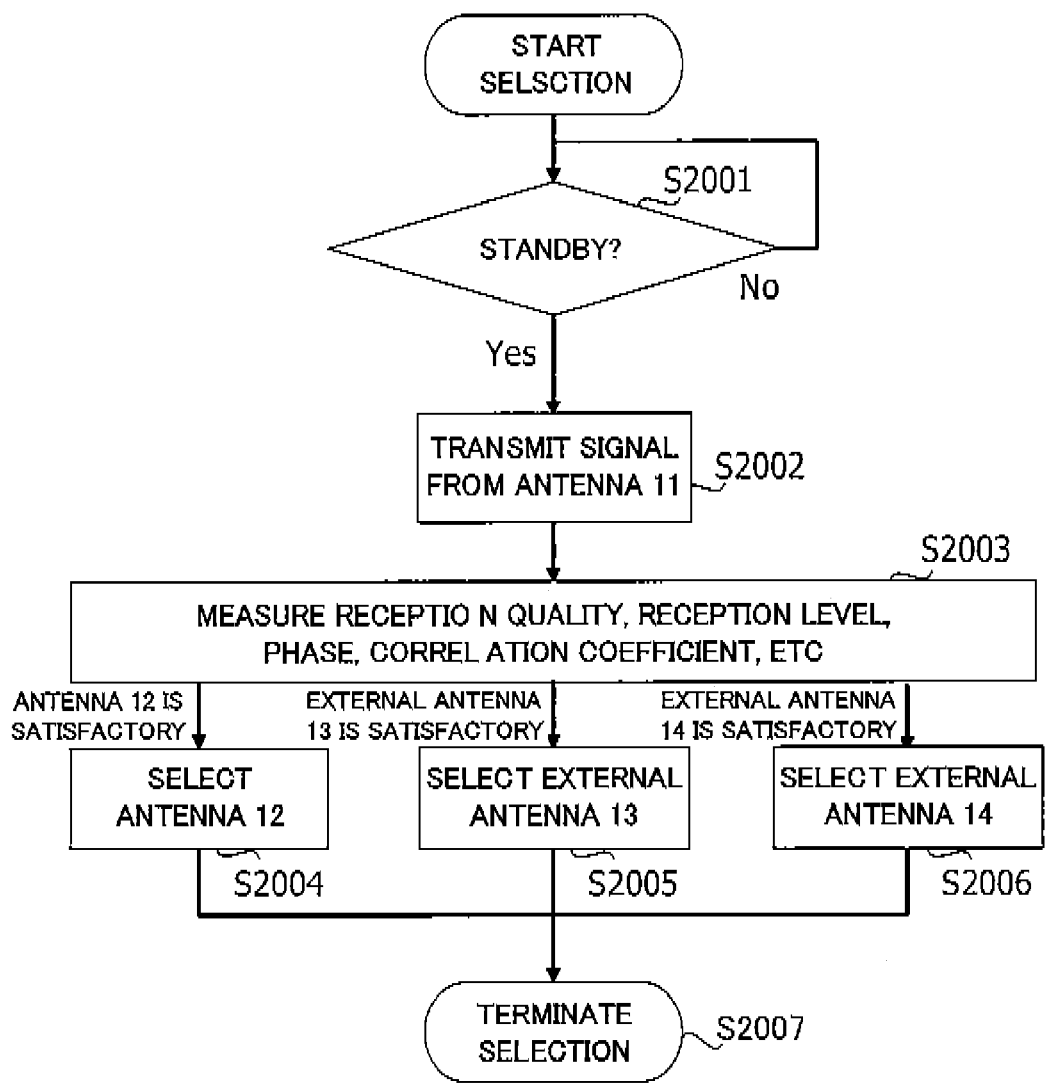

RADIO COMMUNICATION APPARATUS, RADIO COMMUNICATION METHOD, AND NON-TRANSITORY COMPUTER READABLE MEDIUM STORING RADIO COMMUNICATION CONTROL PROGRAM

INCORPORATION BY REFERENCE

This application is based on Japanese Patent Application No. 2009-253257 filed on Nov. 4, 2009 and including specification, claims, drawings and summary. The disclosure of the above Japanese Patent Application is incorporated herein by reference in its entirety.

TECHNICAL FIELD

The present invention relates to a radio communication apparatus and a radio communication method, which can change the antenna configuration at the time of carrying out spatial-multiplexing based communication, and a recording medium recording a radio communication control program which can change the antenna configuration at the time of carrying out spatial-multiplexing based communication.

BACKGROUND ART

In the 3GPP (3rd Generation Partnership Project) which is the international standardization body for the third generation mobile communication systems, standardization of E-UTRA (Evolved-UMTS Transmitter Radio Access) is fostered. The E-UTRA aims at speeding up the 15 generation, UTRA, and is positioned as the 3.9 generation called LTE (Long Term Evolution).

In the LTE, communication is carried out based on spatial multiplexing such as MIMO (Multi-Input Multi-Output) to achieve fast and mass information transfer and improve the frequency use efficiency. Further, the fourth generation, IMT-Advanced, which involves a greater number of spatial multiplexing channels and a wider band has been studied. The MIMO is the communication system that uses a plurality of antennas to increase paths based on spatial multiplexing and improve the throughput. This communication system also uses the same frequency to provide a satisfactory frequency use efficiency. MIMO whose number of inputs is a and whose number of outputs is b is called a×bMIMO. In the LTE, for example, the quantity of antennas at a base station (maximum spatial multiplexing channels) and the quantity of antennas of a terminal (maximum of four), which is 2×2MIMO (4×4MIMO at a maximum).

A terminal in the LTE acquires the quantity of antennas at a base station from information included in a PBCH (Physical Broadcast CHannel) which is a common control channel to globally inform control information unique to systems and cells. This terminal uses an RS (Reference Signal) to calculate a spatial matrix from the RS received at each antenna, uses a PUCCH (Physical Uplink Control CHannel) to inform the base station of a PMI (Precoding Matrix Indicator), RI (Rank Indicator), and CQI (Channel Quality Indicator). The base station decides the precoding and transmission mode based on the PMI, RI and CQI, and uses a PDCCH (Physical Downlink Control CHannel) to inform the terminal of the result of the decision.

When there are a large number of low-correlation spatial multiplexing channels available, for example, communication at a maximum of about 300 Mbps is possible in DL (Down Link). When the radio wave environment is poor, however, a base station carries out communication with transmission diversity in transmission mode. In the latter case, transmission of same data from two antenna ports may not improve the throughput, but can enhance the redundancy to achieve stable communication.

Unexamined Japanese Patent Application KOKAI Publication No. 2008-166855 discloses the configuration that carries out communication using a plurality of antennas.

With the speed of mobile communication improved, the use of spatial multiplexing typified by MIMO further improves the throughput and the frequency use efficiency. However, increasing the number of spatial multiplexing channels brings about various problems such that the quantity of antennas is increased, and dissipation power is increased by an increase in the amount of signal processing. Therefore, there is a limit to the quantity of antennas mountable to a portable terminal which is used in mobile communication.

It is therefore desirable to increase the quantity of antennas in carrying out communication. However, the technique described in Unexamined Japanese Patent Application KOKAI Publication No. 2008-166855 is about where antennas are mounted, such as an external antennaslement is provided at the battery pack of a cellular phone. It is therefore difficult to keep a satisfactory communication state by flexibly changing the antenna configuration according to various situations.

SUMMARY

Accordingly, it is an exemplary object of the present invention to provide a satisfactory communication state by flexibly changing the antenna configuration to be used in spatial-multiplexing based communication according to various situations.

To achieve the object, according to a first exemplary aspect of the invention, there is provided a radio communication apparatus including an antenna set including a plurality of antennas and executing spatial-multiplexing based communication, including:

an antenna selection unit that selects from the antennas a combination of antennas whose quantity is equal to or less than a quantity of counterpart antennas to be communicated, as a combination of antennas to be used in spatial-multiplexing based communication;

a signal processing unit that executes signal processing for communication using the combination of antennas selected by the antenna selection unit; and an antenna configuration specifying unit that specifies a physical configuration of the plurality of antennas, the antenna selection unit selecting the combination of antennas to be used based on the configuration selected by the antenna configuration specifying unit.

The antenna configuration specifying unit may specify a physical inter-antenna distance as the physical configuration of the plurality of antennas, and the antenna selection unit may select a combination of antennas which maximizes the physical inter-antenna distance specified by the antenna configuration specifying unit.

The antenna configuration specifying unit may specify a polarization direction of a radio signal to be transmitted/received by each antenna, and the antenna selection unit may select a combination of antennas with different polarization directions specified by the antenna configuration specifying unit.

To achieve the object, according to a second exemplary aspect of the invention, there is provided a radio communication apparatus including an antenna set including a plurality of antennas and executing spatial-multiplexing based communication, including:

an antenna selection unit that selects from the antennas a combination of antennas whose quantity is equal to or less than a quantity of counterpart antennas to be communicated, as a combination of antennas to be used in spatial-multiplexing based communication;

a signal processing unit that executes signal processing for communication using the combination of antennas selected by the antenna selection unit; and a reception quality detecting unit that detects a reception quality for each combination of a plurality of antennas, the antenna selection unit selecting the combination of antennas to be used according to a result of comparison of reception qualities detected by the reception quality detecting unit.

The radio communication apparatus may further include a communication environment detecting unit that detects a predetermined amount of variation in communication environment of the radio communication apparatus, wherein the antenna selection unit may vary a period of changing a combination of antennas to be selected, depending on whether the amount of variation detected by the communication environment detecting unit is equal to or less than a predetermined reference value.

The radio communication apparatus may further include a communication environment change detecting unit that detects a time-dependent change in a predetermined amount of variation in communication environment of the radio communication apparatus, wherein the antenna selection unit may vary a period of changing a combination of antennas to be selected, depending on whether the time-dependent change in the amount of variation detected by the communication environment change detecting unit is equal to or less than a predetermined reference value.

The signal processing unit may include a plurality of signal processing circuits that process signals to be transmitted/received in association with the a plurality of antennas included in the antenna set, and power supply to that one of the plurality of signal processing circuits which is not used may be stopped based on the combination of antennas selected by the antenna selection unit.

The signal processing unit may include a plurality of signal processing circuits that process signals to be transmitted/received in association with the a plurality of antennas included in the antenna set, and a setting value for carrying out communication with the antennas to be communicated or another antenna to be communicated may be acquired by using an antenna which is not selected by the antenna selection unit and that signal processing circuit which is associated with the antenna.

The antenna set may include:

a first antenna set including a plurality of first antennas in which polarization directions of adjacent antennas are orthogonal to each other; and a second antenna set including a plurality of second antennas in which polarization directions of adjacent antennas are orthogonal to each other.

The antenna set may include:

a first antenna set including a plurality of first antennas which cause polarization directions of signals to be transmitted/received are identical to each other; and a second antenna set including a plurality of second antennas which cause polarization directions of signals to be transmitted/received are identical to each other, and the polarization direction of the signals to be transmitted/received by the plurality of first antennas may be orthogonal to the polarization direction of the signals to be transmitted/received by the plurality of second antennas.

The first antenna set or the second antenna set may be configured to be dismountable from the radio communication apparatus, and the radio communication apparatus may further include a mount detection unit that detects if the first antenna set or the second antenna set is mounted to the radio communication apparatus.

The antenna selection unit may select a combination of antennas in such a way as to always transmit/receive a signal having a certain polarization direction.

To achieve the object, according to a third exemplary aspect of the invention, there is provided a radio communication apparatus including an antenna set including a plurality of antennas and executing spatial-multiplexing based communication, including:

antenna selection means that selects from the antennas a combination of antennas whose quantity is equal to or less than a quantity of counterpart antennas to be communicated, as a combination of antennas to be used in spatial-multiplexing based communication;

signal processing means that executes signal processing for communication using the combination of antennas selected by the antenna selection means; and antenna configuration specifying means that specifies a physical configuration of the plurality of antennas, the antenna selection means selecting the combination of antennas to be used based on the configuration selected by the antenna configuration specifying means.

To achieve the object, according to a fourth exemplary aspect of the invention, there is provided a radio communication apparatus including an antenna set including a plurality of antennas and executing spatial-multiplexing based communication, including:

antenna selection means that selects from the antennas a combination of antennas whose quantity is equal to or less than a quantity of counterpart antennas to be communicated, as a combination of antennas to be used in spatial-multiplexing based communication;

signal processing means that executes signal processing for communication using the combination of antennas selected by the antenna selection means; and reception quality detecting means that detects a reception quality for each combination of a plurality of antennas, the antenna selection means selecting the combination of antennas to be used according to a result of comparison of reception qualities detected by the reception quality detecting means.

To achieve the object, according to a fifth exemplary aspect of the invention, there is provided a radio communication method of executing spatial-multiplexing based communication using an antenna set including a plurality of antennas, including:

an antenna selection step of selecting from the antennas a combination of antennas whose quantity is equal to or less than a quantity of counterpart antennas to be communicated, as a combination of antennas to be used in spatial-multiplexing based communication;

a signal processing step of executing signal processing for communication using the combination of antennas selected by the antenna selection unit; and an antenna configuration specifying step of specifying a physical configuration of the plurality of antennas, the antenna selection step selecting the combination of antennas to be used based on the configuration selected in the antenna configuration specifying step.

To achieve the object, according to a sixth exemplary aspect of the invention, there is provided a radio communication method of executing spatial-multiplexing based communication using an antenna set including a plurality of antennas, including:

an antenna selection step of selecting from the antennas a combination of antennas whose quantity is equal to or less than a quantity of counterpart antennas to be communicated, as a combination of antennas to be used in spatial-multiplexing based communication;

a signal processing step of executing signal processing for communication using the combination of antennas selected by the antenna selection unit; and a reception quality detecting step of detecting a reception quality for each combination of a plurality of antennas, the antenna selection step selecting the combination of antennas to be used according to a result of comparison of reception qualities detected in the reception quality detecting step.

To achieve the object, according to a seventh exemplary aspect of the invention, there is provided a recording medium recording a program allowing a computer that controls a radio communication apparatus which executes spatial-multiplexing based communication using an antenna set including a plurality of antennas, to function as:

an antenna configuration specifying unit that specifies a physical configuration of the plurality of antennas;

an antenna selection unit that selects from the antennas a combination of antennas whose quantity is equal to or less than a quantity of counterpart antennas to be communicated, as a combination of antennas to be used in spatial-multiplexing based communication, based on the configuration specified by the antenna configuration specifying unit; and a signal processing unit that executes signal processing for communication using the combination of antennas selected by the antenna selection unit.

To achieve the object, according to a eighth exemplary aspect of the invention, there is provided a recording medium recording a program allowing a computer that controls a radio communication apparatus which executes spatial-multiplexing based communication using an antenna set including a plurality of antennas, to function as:

a reception quality detecting unit that detects a reception quality for each combination of a plurality of antennas;

an antenna selection unit that selects from the antennas a combination of antennas whose quantity is equal to or less than a quantity of counterpart antennas to be communicated, as a combination of antennas to be used in spatial-multiplexing based communication, according to a result of comparison of reception qualities detected by the reception quality detecting unit; and a signal processing unit that executes signal processing for communication using the combination of antennas selected by the antenna selection unit.

The present invention can provide a satisfactory spatial-multiplexing based communication by changing the antenna configuration flexibly.

BRIEF DESCRIPTION OF THE DRAWINGS

The object and other objects and advantages of the present invention will become more apparent upon reading of the following detailed description and the accompanying drawings in which:

FIGS. 5A to 8C are diagrams each showing a configuration example of antennas with different polarization directions;

FIG. 9 is a flowchart illustrating an example of a process of selecting antennas based on a predetermined measurement result;

EXEMPLARY EMBODIMENT

Figure 1:
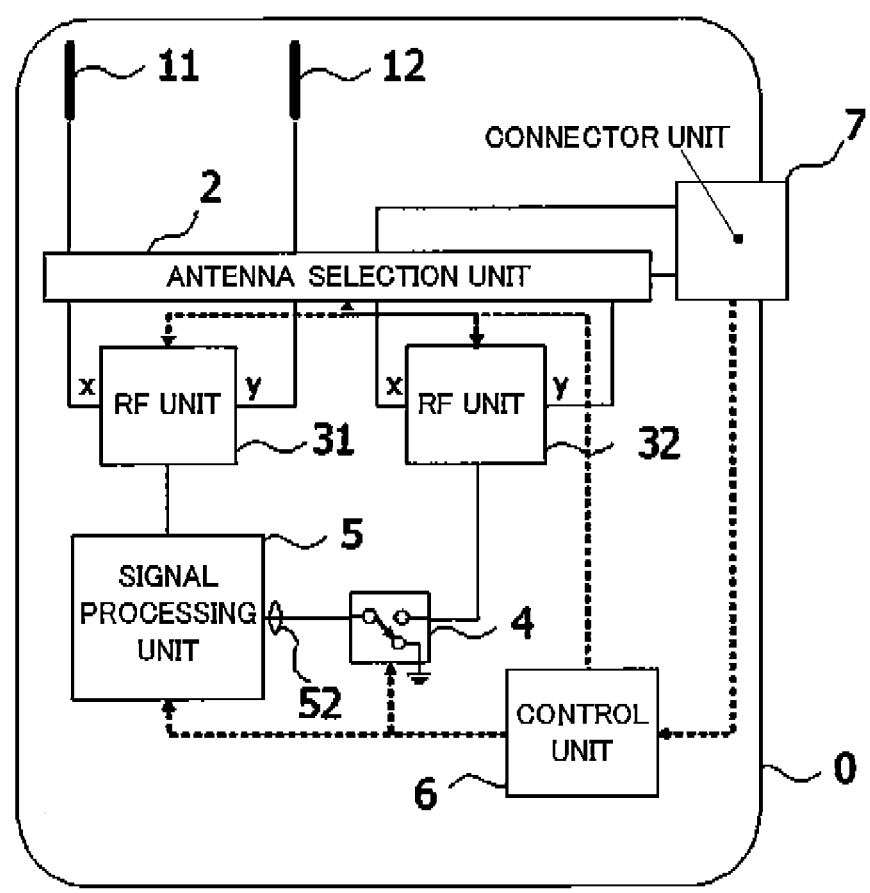
FIG. 1 is a diagram showing an example of the configuration of a terminal according to an exemplary embodiment of the invention.

An exemplary embodiment of the present invention will now be described with reference to the accompanying drawings. FIG. 1 shows one configuration example of a portable terminal device using the MIMO system in the E-UTRA as an application to a radio communication apparatus.

A terminal 0 shown in FIG. 1 is a radio communication apparatus as a portable terminal device, and includes an antenna selection unit 2, an RF switch 4, a signal processing unit 5, a control unit 6, a connector unit 7, an antenna 11, an antenna 12, an RF unit 31, and an RF unit 32. In the configuration example shown in FIG. 1, the antenna 11 and antenna 12 are incorporated in the terminal 0, and are mounted in such a way that each antenna can receive radio signals.

The antenna selection unit 2 is a switch which connects or disconnects the antenna 11, the antenna 12 and the connector unit 7, which are incorporated in the terminal 0, to and from the RF unit 31 and the RF unit 32. Each of the RF units 31 and 32 has a capability of frequency-converting high-frequency signals each of two lines (maximum of four lines) received at the respective antennas including the antenna 11 and the antenna 12. Each of the RF units 31 and 32 has two inputs x and y. Hereinafter, the input x of the RF unit 31 is also denoted as "RF unit 31x", and the input y of the RF unit 31 as "RF unit 31y". Likewise, the input x of the RF unit 32 is also denoted as "RF unit 32x", and the input y of the RF unit 32 as "RF unit 32y" hereinafter.

Each of the RF units 31 and 32 may include an amplifier, such as LNA (Low Noise Amplifier), so as to be able to amplify a received signal. In addition, each of the RF units 31 and 32 may include a weighable attenuator so as to be able to adjust the amplitude of a received signal. Further, each of the RF units 31 and 32 may include a phase shifter using, for example, a delay circuit, so that the phase of a received signal can be adjusted. As apparent from the above, the RF units 31 and 32 should be able to perform various kinds of signal processing on received signals as a pre-stage of demodulation or the like of the signal processing unit 5. It is to be noted that the RF units 31 and 32 may be configured to be able to perform various kinds of signal processing on transmission signals as a post-stage of modulation or the like of the signal processing unit 5.

The RF switch 4 can connect an input 52 of the signal processing unit 5 to the ground. The signal processing unit 5 processes output signals of the RF units 31 and 32. For example, the signal processing unit 5 should perform signal processing, such as orthogonal detection, analog-to-digital (A/D) conversion or fast Fourier transform, using the output signals of the RF units 31 and 32, so that data transmitted in a plurality of sub carriers can be demodulated and decoded. The control unit 6 performs various kinds of control, such as setting the individual sections and ON/OFF actions. The connector unit 7 serves to connect the terminal 0 to an external device.

Figure 2:
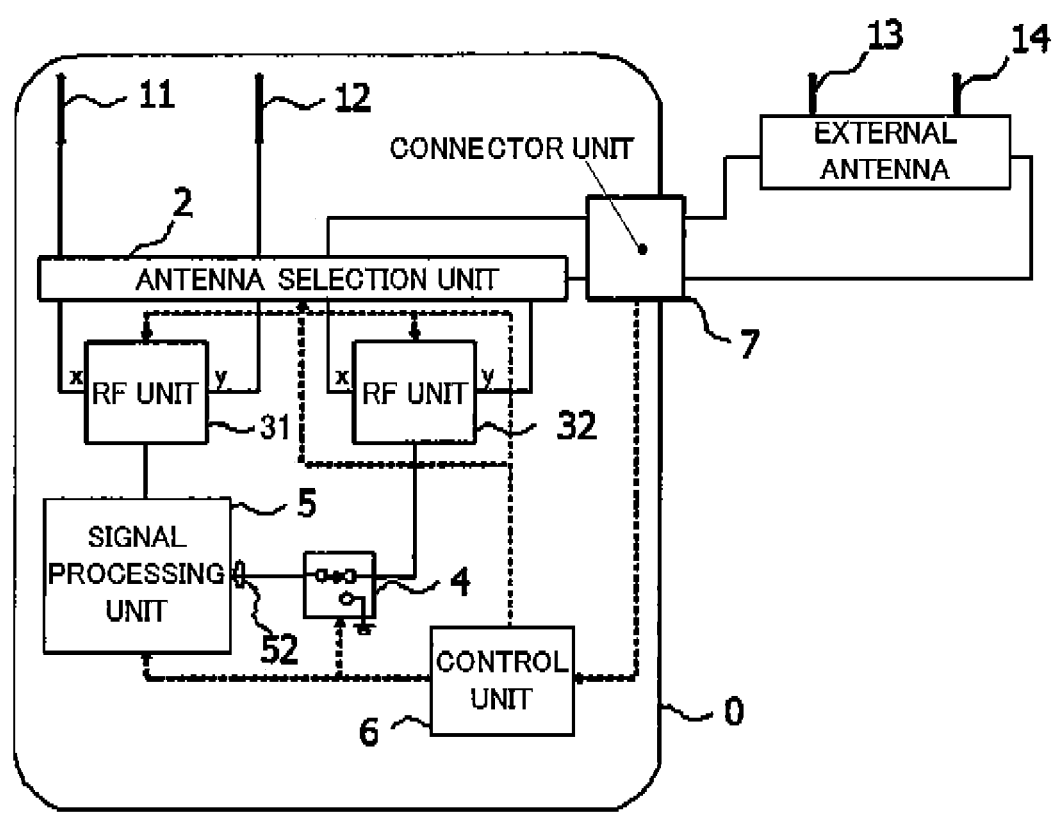
FIG. 2 is a diagram showing an example of the configuration of a terminal to which an external antenna is connected.

FIG. 2 is a diagram shows a configuration example when an external antenna is connected to the terminal 0. An external antenna 13 and an external antenna 14 has a configuration (e.g., a plug) to be connectable to (detachable from) the connector unit 7, and has frequency characteristics similar to those of the antennas 11 and 12. The control unit 6 should detect the connection (mounting) of the external antenna 13 and the external antenna 14 by means of a change in the electrical characteristic of the connector unit 7, a switch or the like. The connection (mounting) of the external antenna 13 and the external antenna 14 can permit signals of not only two lines but signals of up to four lines to be transmitted and received, so that the combination of antennas to be used in spatial-multiplexing based communication can be changed flexibly. When the combination of the antennas 11 and 12 is selected, the space of the terminal 0 can be saved (reduced) by removing the external antenna 13 and the external antenna 14.

Figure 3A:
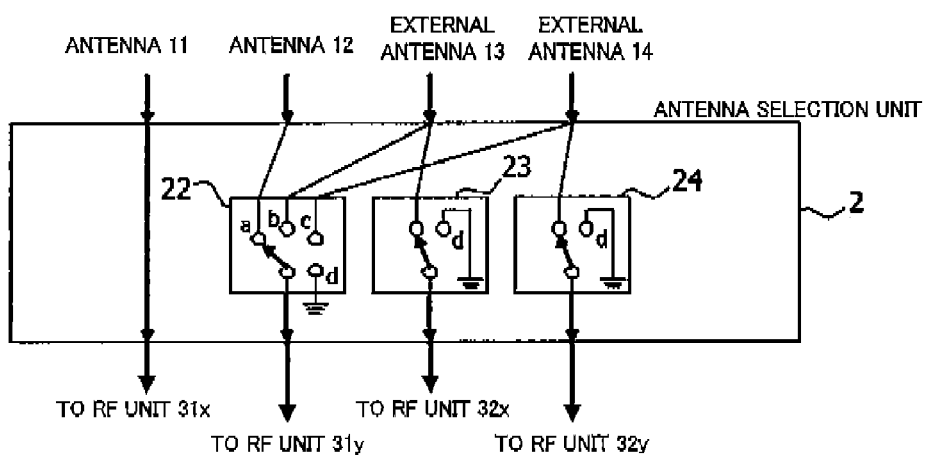
FIGS. 3A and 3B are diagrams each showing an example of the configuration of an antenna switch.
Figure 3B:
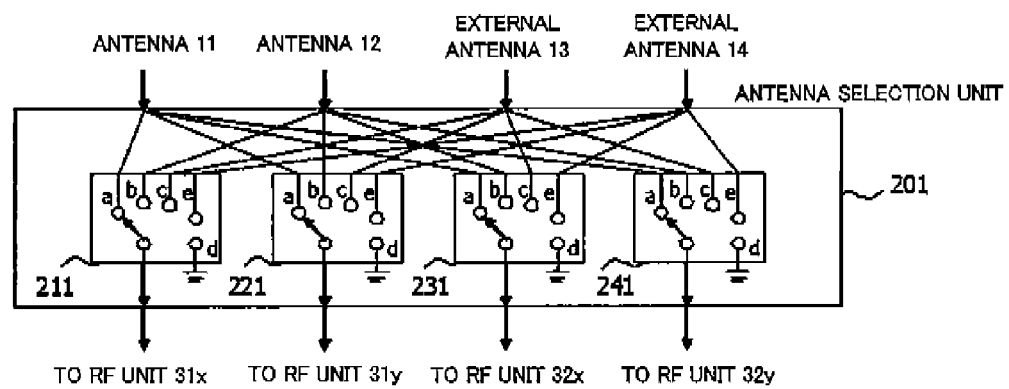

FIGS. 3A and 3B show examples of the configuration of the antenna selection unit 2. In the configuration example shown in FIG. 3A, the antenna selection unit 2 always transfers (outputs) a signal received at the antenna 11 to the input x of the RF unit 31 (RF unit 31x). The antenna selection unit 2 shown in FIG. 3A includes three antenna switches 22 to 24. The antenna switch 22 can be switched to transfer (output) a signal received at any one of the antenna 12, the antenna 13, and the external antenna 14 to the input y of the RF unit 31 (RF unit 31y). Therefore, it is possible to select an antenna which has a low correlation to the antenna 11 as an antenna to be used with the antenna 11. The antenna switch 23 can be switched whether or not to transfer (output) a signal received at the external antenna 13 to the input x of the RF unit 32 (RF unit 32x), making it possible to select whether the external antenna 13 is connected to the input x of the RF unit 32 or to a terminal d to be the ground. The antenna switch 24 can be switched whether or not to transfer (output) a signal received at the external antenna 14 to the input y of the RF unit 32 (RF unit 32y), making it possible to select whether the external antenna 14 is connected to the input y of the RF unit 32 or to the terminal d to be the ground.

In this manner, the antenna switch 23 and the antenna switch 24 can connect the inputs of the RF unit 32 (RF unit 32x, RF unit 32y) to the ground. This can prevent signals received at the external antenna 13 or the external antenna 14 from being input to the circuit board or the RF unit 32, thereby inhibiting occurrence of interference signals.

An antenna selection unit 201 with a configuration exemplified in FIG. 3B may be used as the antenna selection unit 2. In the configuration example shown in FIG. 3B, the antenna selection unit 201 can freely select connection of each antenna to each RF unit. That is, the antenna selection unit 201 differs in configuration from the antenna selection unit 2 shown in FIG. 3A in that, for example, the antenna 11 is not directly connected to the input x of the RF unit 31 (RF unit 31x). The antenna selection unit 201 shown in FIG. 3B includes four antenna switches 211, 221, 231 and 241. Each antenna switch 211, 221, 231, 241 can be switched to select one of the four antennas (antenna 11, antenna 12, external antenna 13 and external antenna 14) and the terminal d to be the ground, and connect the selected element to the input of the corresponding RF unit. The configuration of the antenna selection unit 201 provides various selectable combinations of antennas, so that the combination of antennas to be used can be selected flexibly to ensure satisfactory communication based on spatial multiplexing.

Figure 4:
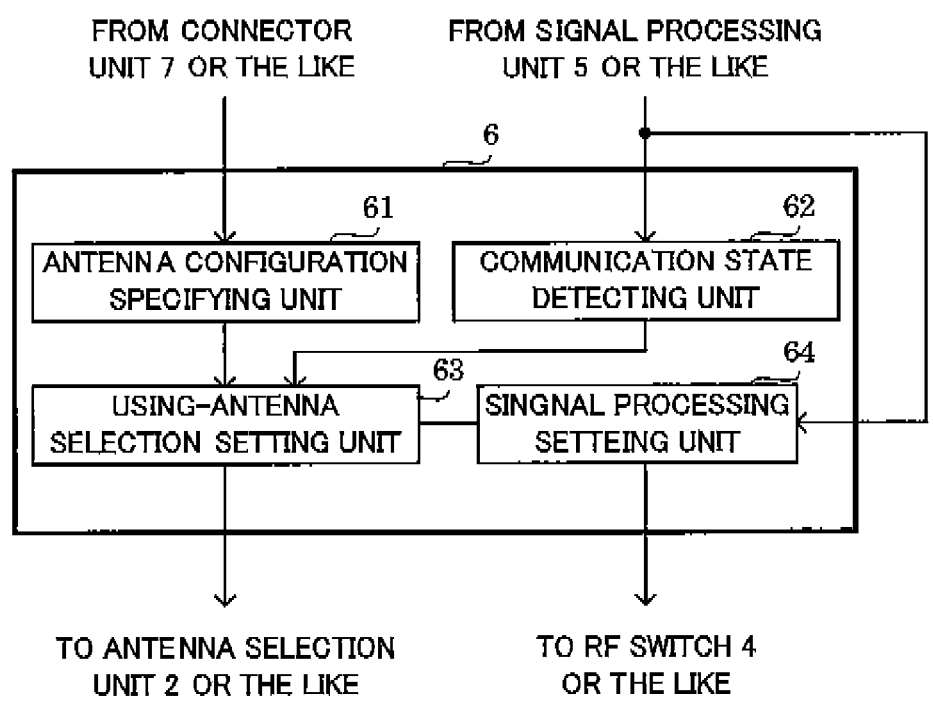
FIG. 4 is a diagram showing an example of the configuration of a control unit.

In the terminal 0, a satisfactory spatial multiplexing based communication is established by flexibly changing the combination of antennas to be used to carry out spatial-multiplexing based communication according to various situations. To achieve the purpose, the control unit 6 reads and executes an operational program stored in a storage unit (e.g., flash memory, ROM, RAM, HDD, optical disc storage device, or magneto-optical disk storage device) incorporated in the terminal 0 or externally connected thereto to realize functions as shown in FIG. 4. As shown in FIG. 4, the control unit 6 should function as an antenna configuration specifying unit 61, a communication state detecting unit 62, a using-antenna selection setting unit 63, a signal processing setting unit 64, etc.

The antenna configuration specifying unit 61 specifies the antenna configuration, such as the layout of antennas. The antenna configuration is specified by setting data or the like indicative of the physical distance between a plurality of antennas (antenna 11, antenna 12, external antenna 13, external antenna 14, etc.) which can be used by the terminal 0, and the directions of the individual antennas (directions of reception polarizations).

The antenna configuration specifying unit 61 may read out setting data from the storage unit incorporated in the terminal 0 to specify the structures or the like of antennas. Alternatively, the structures or the like of antennas may be specified by reading setting data externally input to the terminal 0. As another option, the terminal 0 may include an input unit through which the manufacturer or user of the terminal 0 can input data indicative of the structures of antennas, so that the antenna configuration specifying unit 61 may read the data input through the input unit to specify the structures or the like of antennas.

Further, the antenna configuration specifying unit 61 should specify the structures or the like of antennas by detecting the connection state of the external antenna 13 or the external antenna 14 in the connector unit 7. In addition, the antenna configuration specifying unit 61 may specify the structures or the like of antennas based on the results of reception at other antennas.

The communication state detecting unit 62 detects various states relating to the communication operation of the terminal 0. For example, the communication state detecting unit 62 should detect the communication state based on the connection states of the external antenna 13 and the external antenna 14 in the connector unit 7, the selected setting of antennas in the antenna selection unit 2, the results of processing received signals in the RF units 31 and 32, and the signal processing unit 5, etc.

The communication state detecting unit 62 may detect the charged amount (remaining amount) of the battery of the terminal 0, the amount of data to be communicated, the inclination of the terminal 0, the moving speed thereof, the moving direction thereof, the result of transmitting/receiving a reference signal for measurement, and the like, as a state relating to the communication operation.

The using-antenna selection setting unit 63 performs setting to select a combination of antennas to be used to carry out spatial-multiplexing based communication from a plurality of antennas including the antenna 11, the antenna 12, the external antenna 13 and the external antenna 14. For example, the using-antenna selection setting unit 63 should select a combination of antennas by sending a select control signal corresponding to the combination of antennas to be used to the antenna selection unit 2 based on the antenna configuration (structures or the like) specified by the antenna configuration specifying unit 61. The using-antenna selection setting unit 63 should select a combination of antennas by sending a select control signal based on the state of the communication operation of the terminal 0 which is detected by the communication state detecting unit 62.

The signal processing setting unit 64 performs process setting of communication signals in various circuits included in the terminal 0 in association with the combination of antennas selected by the using-antenna selection setting unit 63. For example, the signal processing setting unit 64 should change over and control the operations of various circuits or the like by sending a changeover control signal corresponding to the combination of antennas set by the using-antenna selection setting unit 63 to the RF switch 4, the RF unit 31, the RF unit 32 and the signal processing unit 5.

The operation of the terminal 0 which has the foregoing configuration and functions will be described below. First, the process of the terminal 0 in normal standby mode will be described. Various processes to be described below may be realized, for example, as the control unit 6 in the terminal 0 reads and executes the program stored in the storage unit (e.g., flash memory, ROM, RAM, HDD, optical disc storage device, or magneto-optical disk storage device) incorporated in the terminal 0 or externally connected thereto to control the individual configurations of the terminal 0 and achieve the individual functions of the control unit 6.

In normal standby mode, signal received at the antenna 11 and the antenna 12 incorporated in the terminal 0 travel through the antenna selection unit 2 to be input to the RF unit 31. At this time, processing is carried out in two lines in the terminal 0. Accordingly, the RF unit 31 is enabled, and the RF unit 32 is disabled by the signal processing setting unit 64 or the like in the control unit 6. Disabling the RF unit 32 which will not be used stops power supply to the RF unit 32, reducing dissipation power. Further, the control unit 6 sets open the terminal of the antenna selection unit 2 which is connected to the connector unit 7 for external antenna by means of the using-antenna selection setting unit 63 or the like, thereby connecting the RF unit 32$x$ and RF unit 32$y$ or the inputs of the RF unit 32 to the ground.

The RF switch 4 sets the output of the disabled RF unit 32 open, and connects the input to the signal processing unit 5 to the ground. The output of the RF unit 31 is input to the signal processing unit 5, which calculates a usable RI and PMI from the RS transmitted from the base station, and informs the base station of the RI and PMI using the PUCCH as CQI. The base station maps the DCI with the RI and PMI included in the PDCCH, and informs the terminal 0 subframe by subframe. The signal processing unit 5 performs decoding through the process informed by the base station. 2×2MIMO based communication using two lines can be carried out this way.

When the external antenna 13 and the external antenna 14 are connected to the connector unit 7 as shown in FIG. 2, by way of contrast, the terminal 0 may be configured to have four antennas. In this case, the terminal 0 can perform 4×4MIMO based communication using four lines, and ensure communication twice as fast as the 2×2MIMO based communication.

Figure 5A:
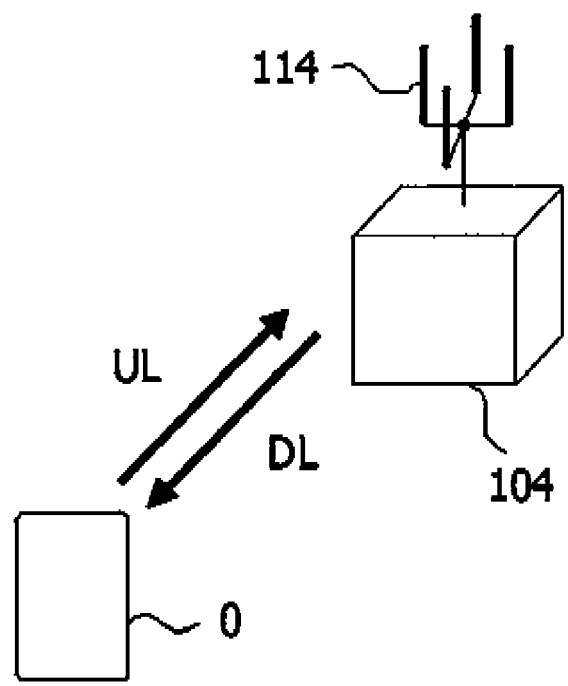
FIGS. 5A and 5B are diagrams each showing the quantity of antennas at a base station.

A description will now be given of a case where the base station has four antennas. FIG. 5A exemplifies a case where a base station 104 has four antennas 114. In this example, the maximum number of spatial multiplexing is four. In the terminal 0, the signal processing setting unit 64 or the like in the control unit 6 performs ON control on the RF switch 4, and enables the RF unit 32. At this time, the set values of the RF unit 31 and the signal processing unit 5 which have already been operating before the setting may be reflected on the setting of the RF unit 32 and the signal processing unit 5. This can make the activation process faster.

For example, the signal processing setting unit 64 in the control unit 6 may read various settings, such as the frequency band, system bandwidth, frame structure, CP length, cell ID and gain setting, from the operational contents of the RF unit 31 and the signal processing unit 5. Alternatively, those settings may be detected by the communication state detecting unit 62, and the signal processing setting unit 64 may be informed of the detection result.

With the RF unit 32 enabled, the terminal 0 has a 4-antennas configuration and can process signals of four lines. The terminal 0 receives the RS from the base station after performing predetermined setting, and informs the base station of the PMI and CQI. The base station informs the terminal 0 of the setting, and initiates 4×4MIMO based communication when the radio wave environment is satisfactory. A portable terminal device which can achieve 4×4MIMO can be provided this way, thus ensuring communication with the maximum throughput in the DL of LTE. Of course, enabling the RF unit 32 and increasing paths (channels) increase the load on the signal processing unit 5, increasing dissipation power. To cope with it, the RF unit 32 may be disabled properly.

Figure 6:
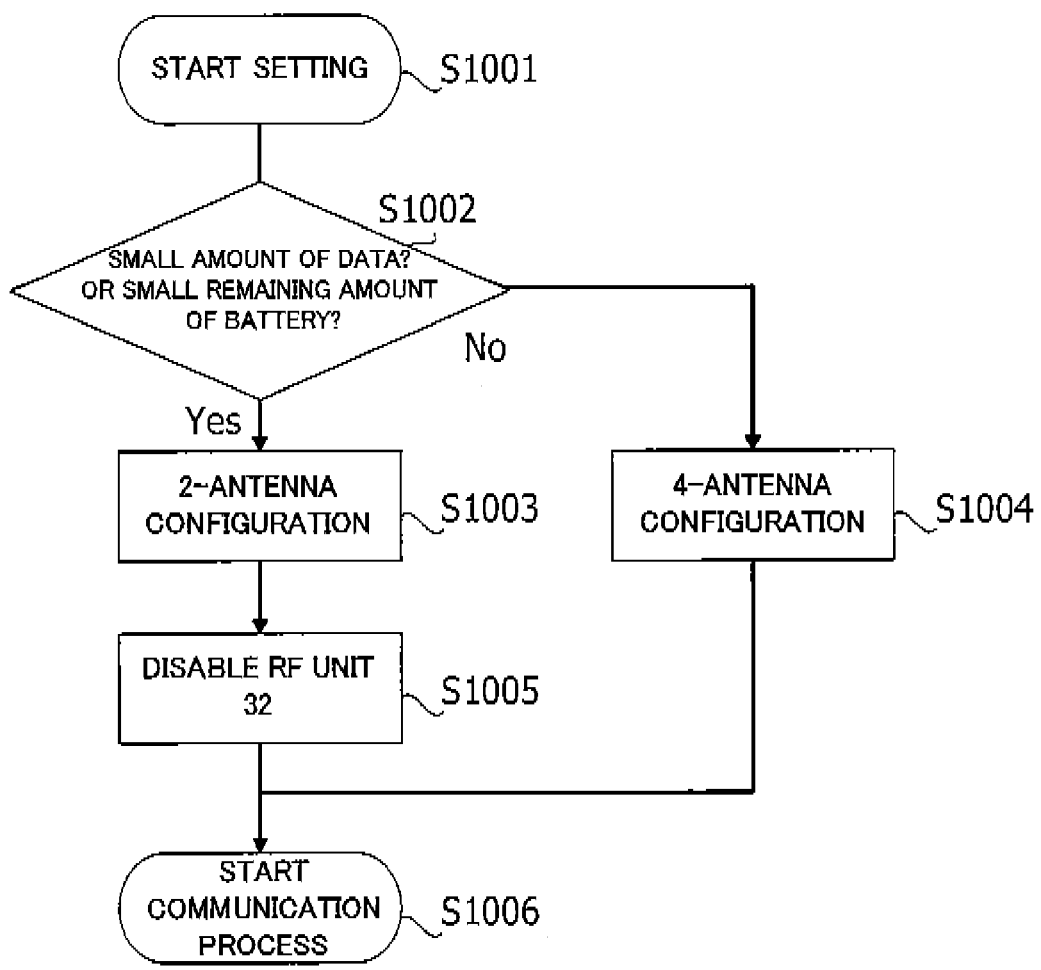
FIG. 6 is a flowchart illustrating an example of a process of changing the antenna configuration according to the amount of communication data and the remaining amount of a battery.

FIG. 6 is a flowchart illustrating an example of a process of changing the antenna configuration. In the process illustrated in FIG. 6, the control unit 6 of the terminal 0 checks the amount of data to be communicated and the remaining amount of the battery when setting is started (S1001). At this time, it is determined whether the amount of data to be communicated and the remaining amount of the battery are large or small (S1002). For example, reference values for determining whether the amount of data to be communicated and the remaining amount of the battery are large or small are pre-stored in the control unit 6, and the communication state detecting unit 62 determines whether the amount of data to be communicated and the remaining amount of the battery are equal to or less than the reference values. When the amount of data to be communicated and the remaining amount of the battery are equal to or less than the reference values, it is determined that the amount of data to be communicated and the remaining amount of the battery are small.

When it is determined that the amount of data to be communicated and the remaining amount of the battery are small (S1002; Yes), the control unit 6 changes over the antenna selection unit 2, the RF switch 4, etc. to set two antennas to be selected by using the using-antenna selection setting unit 63, the signal processing setting unit 64, etc. (S1003). Accordingly, the control unit 6 sets the antenna configuration to connect the antenna 11 and the antenna 12 to the RF unit 31. The signal processing setting unit 64 in the control unit 6 disables the RF unit 32 which is not connected to the selected antennas (S1005), and initiates the communication process (S1006).

When at least one of the amount of data to be communicated and the remaining amount of the battery is larger than the reference value, i.e., when the amount of data is large or the remaining amount of the battery is large (S1002; No), on the other hand, the control unit 6 changes over the antenna selection unit 2 and the RF switch 4 to set four antennas to be selected (S1004). In this case, the signal processing setting unit 64 in the control unit 6 initiates the communication process without disabling the RF unit 31 and the RF unit 32 (S1006).

As apparent from the above, when the amount of data to be communicated is small or the remaining amount of the battery is small, power can be saved by disabling the RF unit 32 or reducing the load on the signal processing unit 5. The antenna configuration may be changed according to whether the terminal 0 is connected to an AC power supply or not. When the terminal 0 is connected to an AC power supply, for example, the quantity of antennas to be selected through the process of S1004 may be set to four, whereas when the terminal 0 is not connected to an AC power supply, the quantity of antennas to be selected through the process of S1003 may be set to two.

When the remaining amount of the battery is small although the amount of data to be communicated is large, the base station or a counterpart terminal or the like may be notified that communication is not possible, so that the communication process will not be initiated. When the remaining amount of the battery is large although the amount of data to be communicated is small, the quantity of antennas to be used and whether the RF units are usable or not may be set based on designation made by the user of the terminal 0.

Figure 5B:
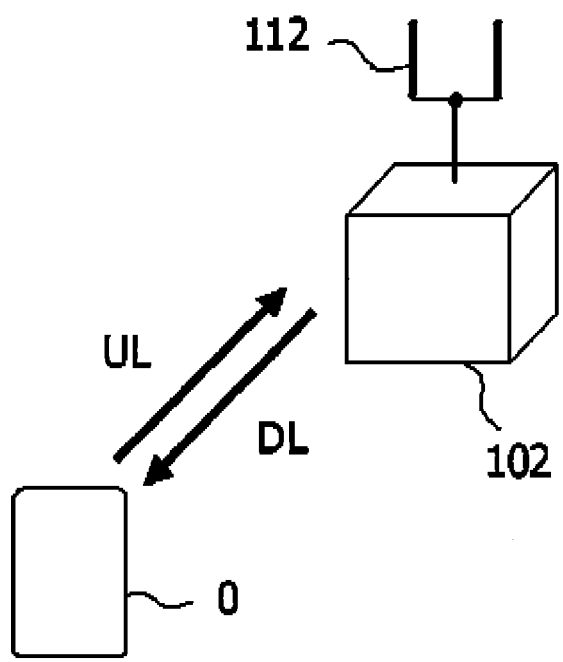

Subsequently, a description will be given of a case where the base station has two antennas. FIG. 5B exemplifies a case where a base station 102 has two antennas 112. In this example, the maximum number of spatial multiplexing is two. The E-UTRA standards do not support a case where the quantity of antennas in the terminal is larger than the quantity of antennas in the base station, as in the case of 2×4 MIMO where the quantity of antennas in the base station is two and the quantity of antennas in the terminal 0 is four. From the viewpoint of power saving, therefore, it is desirable that the terminal 0 should avoid taking a 4-line configuration provided by the antennas 31, the RF unit 32 and the signal processing unit 5 when the quantity of antennas in the base station is two. For example, the using-antenna selection setting unit 63 in the control unit 6 sets only two antennas to be used, namely, the antenna 11 and the antenna 12, and disables the RF unit 32 by means of the signal processing setting unit 64 or the like to stop feeding power to the RF unit 32 which is not used. In addition, the setting to allow the signal processing unit 5 to perform 2-line signal processing can reduce the load on the signal processing unit 5, thereby reducing dissipation power. As apparent from the above, antennas whose quantity is equal to or less than the quantity of antennas in the counterpart base station to be communicated should be selected in the terminal 0 under control of the control unit 6 to determine the antenna configuration for spatial-multiplexing based communication.

In the above example, the antenna 11 and the antenna 12 are selected when the quantity of antennas to be used in the terminal 0 is two. In the case of the MIMO that uses a plurality of antennas, the lower the correlation between antennas is, the greater the effect of spatial multiplexing can be expected. Accordingly, the description will be given of configuration examples and operational examples of the embodiment for selecting a combination of antennas with low correlation in case of selectively using some of the four antennas, namely, the antenna 11, the antenna 12, the external antenna 13 and the external antenna 14, which can be used by the terminal 0. It is generally known that as the distance between antennas becomes longer, the correlation therebetween gets lower. Therefore, if antennas which maximizes the physical inter-antenna distance, such as the antenna 11 and the external antenna 14 shown in FIG. 2, are selected, the correlation between the antennas becomes lower, which provides a satisfactory configuration for carrying out spatial-multiplexing based communication.

In addition to the antenna 11 and the external antenna 14, for example, one of the antenna 12 and the external antenna 13 may be selectively used. In this case, the distances among each of the antenna 12 and the external antenna 13 and the antenna 11 and the external antenna 14 which have already been selected should be specified, and the one which provides a larger sum of the specified inter-antenna distances should be selected. That is, a combination of antennas to be used should be selected in such a way that the sum of the physical inter-antenna distances becomes maximum. The selection of antennas which maximize the sum of the inter-antenna distances increases the isolation between antennas and reduces the coupling between antenna's elements, thereby improving the precision of calculating the correlation coefficient that indicates the degree of correlation. In this manner, antennas to be used should be selected based on the physical distances among a plurality of antennas to determine the antenna configuration for carrying out spatial-multiplexing based communication.

It is known that the correlation between antennas whose polarizations are orthogonal to (different from) each other is low. As another example of selecting a combination of antennas with low correlation, configuration examples and selection operations which take polarization into account will be described.

Figure 7A:
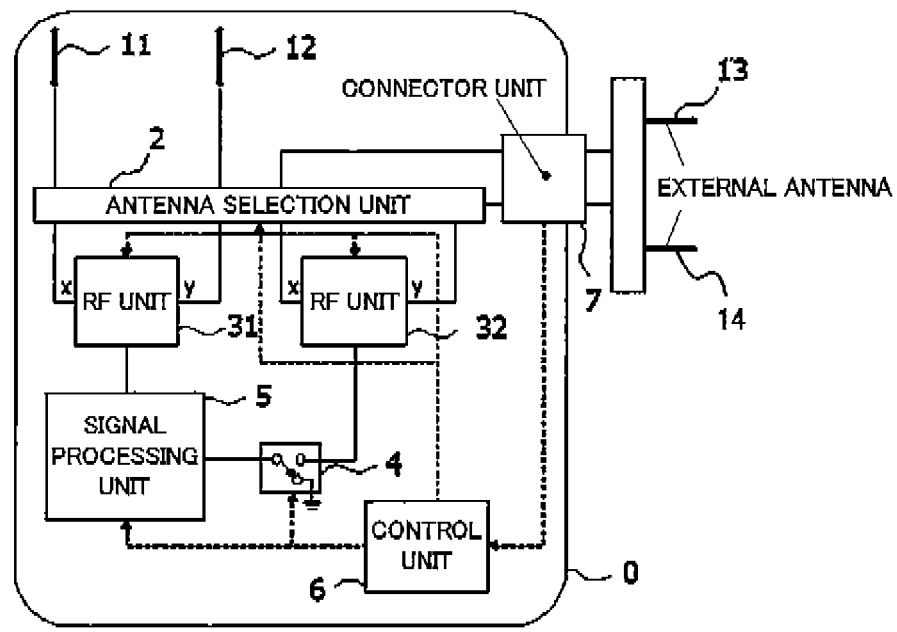
FIGS. 7A and 7B are diagrams each showing a configuration example of antennas whose polarization directions are orthogonal to one another.

In a configuration example shown in FIG. 7A, the antenna 11 and the antenna 12 are antennas for vertical polarization, which are vertical to the ground. On the other hand, the external antenna 13 and the external antenna 14 are antennas for horizontal polarization, which are horizontal to the ground. In this case, the antenna 11 and the antenna 12 whose transmitted/received signals have the identical polarization direction constitute one antenna set (first antenna set). The external antenna 13 and the external antenna 14 whose transmitted/received signals have the identical polarization direction constitute another antenna set (second antenna set). The first antenna set and the second antenna set are arranged in such a way that the polarization direction of a signal transmitted/received by the antenna 11 or the antenna 12 included in the first antenna set is orthogonal to the polarization direction of a signal transmitted/received by the external antenna 13 or the external antenna 14 included in the second antenna set. The second antenna set including the external antenna 13 and the external antenna 14 is configured to be attachable to and detachable from the terminal 0. In such a configuration example, the combination of the antenna 11 or the antenna 12 and the external antenna 13 or the external antenna 14 can make the correlation between two antennas lower. That is, arbitrary selection of one antenna included in the first antenna set and one antenna included in the second antenna set provides a combination of antennas with low correlation, so that a satisfactory spatial-multiplexing based communication can be provided. The first antenna set and the second antenna set may be replaced with each other.

Figure 7B:
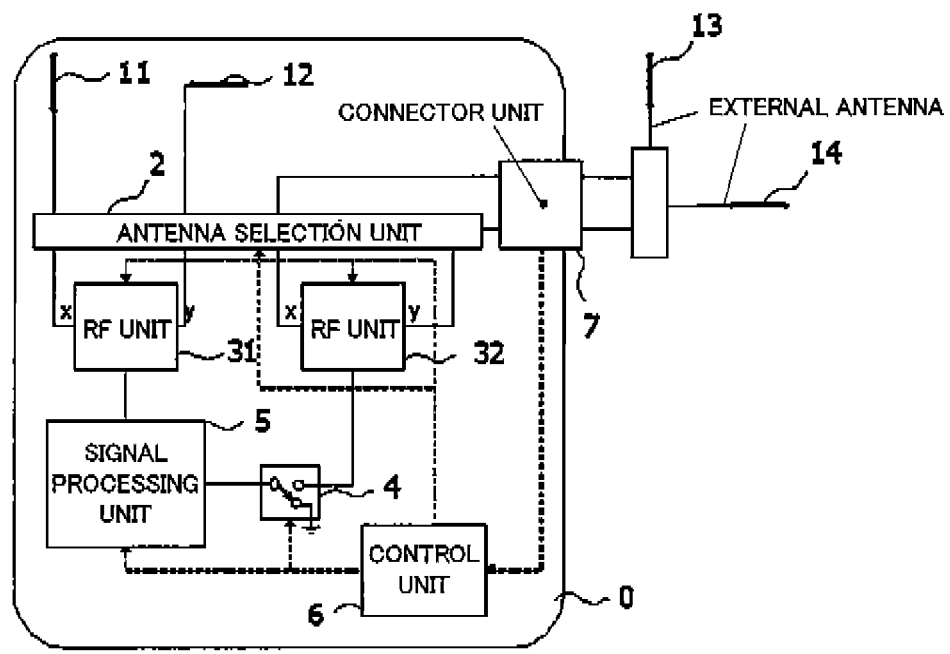

In a configuration example shown in FIG. 7B, the antenna 11 and the external antenna 13 are antennas for vertical polarization, which are vertical to the ground. On the other hand, the antenna 12 and the external antenna 14 are antennas for horizontal polarization, which are horizontal to the ground. In this case, the antenna 11 and the antenna 12 whose polarization directions are orthogonal to each other are located adjacent to each other to constitute one antenna set (first antenna set). The external antenna 13 and the external antenna 14 whose polarization directions are orthogonal to each other are located adjacent to each other to constitute another antenna set (second antenna set). The second antenna set including the external antenna 13 and the external antenna 14 is configured to be attachable/detachable to/from the terminal 0. In such a configuration example, the combination of the antenna 11 or the external antenna 13 and the antenna 12 or the external antenna 14 can reduce the correlation between two antennas. That is, proper selection of one antenna included in the first antenna set or the second antenna set, and one antenna included in the first antenna set or the second antenna set provides a combination of antennas with low correlation, thus providing a satisfactory spatial-multiplexing based communication. In addition, even when the external antenna 13 and the external antenna 14 are not connected to the terminal 0, the antenna 11 and the antenna 12 if selected can be a combination of antennas with low correlation. The first antenna set and the second antenna set may be replaced with each other.

Figure 8A:
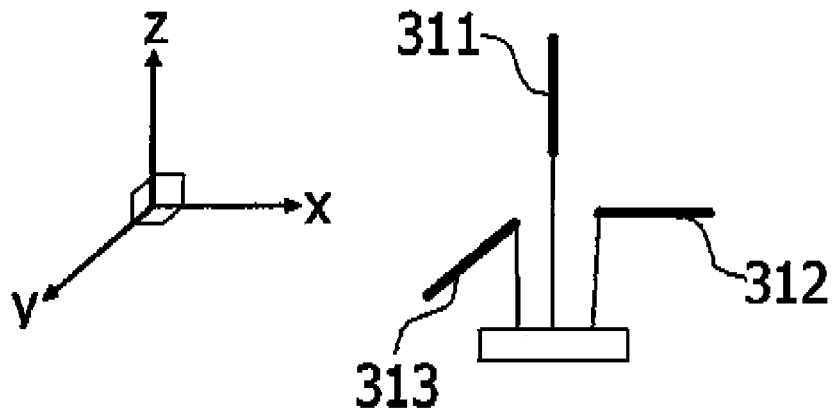
Figure 8B:
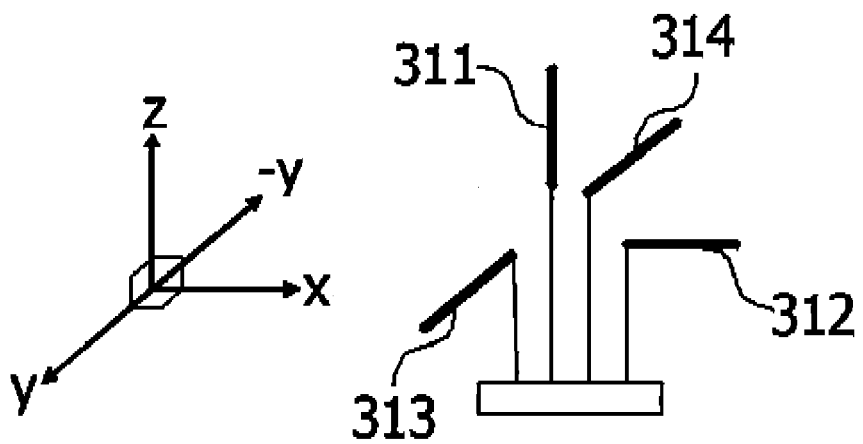
Figure 8C:
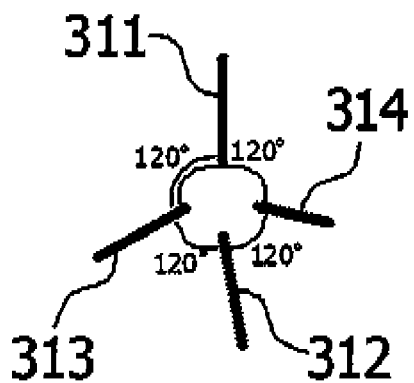

FIGS. 8A to 8C show configuration examples of antennas laid out three-dimensionally. Antennas 311 to 314 shown in FIGS. 8A to 8C are linear polarization antennas. Arrows in the diagrams represent the directions of polarizations corresponding to the respective antennas.

FIG. 8A shows the configuration of three antennas with an antenna 312 in the x direction, an antenna 313 in the y direction and an antenna 311 in the z direction laid out so as to be orthogonal (90°) to one another to make the correlation between antennas lower. FIG. 8B shows the configuration of four antennas laid out three-dimensionally. When the four antennas are arranged two-dimensionally and four antennas are selected (all antennas are selected) as shown in FIGS. 7A and 7B, there are two pairs of antennas which are not orthogonal. In the antenna configuration shown in FIG. 8B, an antenna 314 in the −y direction is disposed in addition to the antenna configuration shown in FIG. 8A. Therefore, antennas which do not orthogonal to each other are a pair of the antenna 313 and antenna 314 whose polarization directions are the same, making it possible to reduce a pair of antennas whose polarization directions are not orthogonal to each other as compared with the two-dimensional layout. FIG. 8C shows a configuration example where four antennas are laid out so as to cross one another at angles of 120°. In this configuration example, while the antennas are not exactly orthogonal to one another, the polarization directions do not become identical, so that the correlation between the antennas can be set lower.

The combination of some or all of the antenna 11, the antenna 12, the external antenna 13 and the external antenna 14 or the combination of the antennas 311 to 314 allows antennas with orthogonal (different) polarizations to be selectively used. This can provide the antenna configuration which reduces the correlation between a plurality of antennas and is satisfactory for carrying out spatial-multiplexing based communication.

For example, in case of reading setting data indicative of the physical distances among the individual antennas or setting data indicative of the directions of polarizations corresponding to the respective antennas to select some (a plurality of antennas) of all the antennas, the antenna configuration specifying unit 61 in the control unit 6 should select antennas to be used according to the physical configurations of the individual antennas in such a way as to reduce the correlation among a plurality of antennas.

The method of specifying the physical configurations of a plurality of antennas is not limited to reading setting data prepared in advance, and a predetermined measurement may be performed. FIG. 9 is a flowchart illustrating an example of a process of selecting antennas to be used according to the physical configurations of individual antennas specified based on the result of the predetermined measurement. In this example, the antenna 11 is preset (fixed) as an antenna to be used.

When the process shown in FIG. 9 starts, the control unit 6, e.g., the communication state detecting unit 62, in the terminal 0 determines whether it is a standby state or not, i.e., whether it is in standby mode, before measurement of RS, before initiation of communication, or no communication state, by detecting the operational state of the signal processing unit 5 or the like (S2001). When having determined that it is not in standby mode (S2001; No), the control unit 6 repeatedly executes the process of S2001. When having determined that it is in standby mode (S2001; Yes), on the other hand, the control unit 6 transmits a reference signal for measurement from the antenna 11 by causing, for example, the antenna configuration specifying unit 61 or the communication state detecting unit 62 to output a predetermined command signal to the signal processing unit 5 and the RF unit 31 (S2002).

The reference signal transmitted from the antenna 11 in S2002 is received by another antenna 12, external antenna 13, or external antenna 14. At this time, the physical configuration of each antenna, such as the positional relation and the degree of correlation, from the reception level, the phase, the measured reception quality, the correlation coefficient, etc. (some or all of them) (S2003). Then, the control unit 6 selects an antenna to be used with the antenna 11 from the antenna 12, the external antenna 13 and the external antenna 14 based on the result of measurement in S2003 (S2004 to S2006). When such an antenna is selected based on the result of measuring the reception level, for example, an antenna whose reception level for the reference signal is the lowest is selected from the antenna 12, the external antenna 13 and the external antenna 14. This is the antenna farthest from the antenna 11 that has transmitted the reference signal, or the antenna whose polarization direction provides the largest difference from the polarization direction of a radio signal to be transmitted/received from/at the antenna 11, and it can be assumed that the antenna has low correlation to the antenna 11. After antenna selection is finished this way, the control unit 6, e.g., the sisal processing setting unit 64, performs operational setting of the RF switch 4, the signal processing unit 5, the RF unit 31 and the RF unit 32 according to the selected antenna. As a result, signal processing for carrying out communication with the combination of the selected antennas is started (S2007).

Selecting a combination of antennas with low correlation according to the physical configuration of each antenna specified based on the result of such a predetermined measurement can provide a satisfactory antenna configuration for spatial-multiplexing based communication. When one of the antenna 12, the external antenna 13 and the external antenna 14 is preset (fixed) as an antenna to be used, the reference signal for measurement is transmitted from the antenna to be used in S2002. The antenna with low correlation should be selected based on the result of the measurement performed then in S2003. The phase difference when the reference signal transmitted from the antenna 11 is received at other antennas (antenna 12, external antenna 13 and external antenna 14) may be measured, and the antenna with the largest phase difference may be selected. In this manner, a combination of antennas with low correlation can be selected based on the result of a predetermined measurement performed when the reference signal transmitted from one of the antenna 11 and antenna 12 incorporated in the terminal 0, and the external antenna 13 and external antenna 14 connected to the terminal 0 is received at the other antennas.

Figure 10:
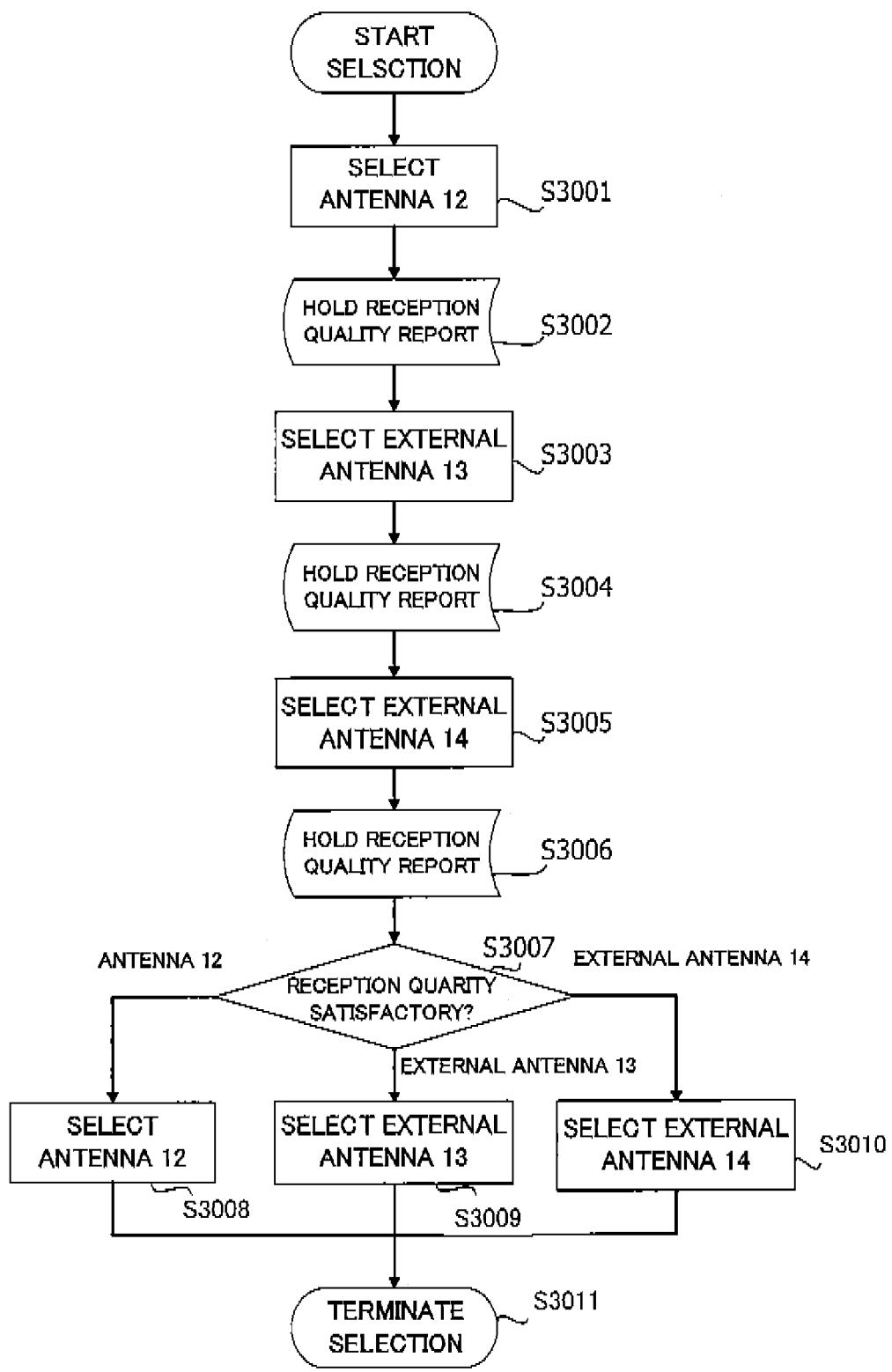
FIG. 10 is a flowchart illustrating an example of a process of selecting antennas based on a reception quality report.

Further, a description will be given of a case where a reception quality report showing CQI, RI, etc., for example, as another example of selecting a combination of antennas to be used in spatial-multiplexing based communication. FIG. 10 is a flowchart illustrating an example of a process of selecting antennas to be used based on a predetermined reception quality report. It is assumed in this example too that the antenna 11 is preset (fixed) as an antenna to be used as in the process example illustrated in FIG. 9.

In the process illustrated in FIG. 10, first, the antenna 12 is selected (S3001). Then, a reception quality report when the antenna 11 and the antenna 12 are used is held (S3002). For example, the communication state detecting unit 62 in the control unit 6 should predict the DL channel characteristic from the result or the like of executing signal processing in the signal processing unit 5, and prepare a reception quality report showing the predicted DL channel characteristic. After the reception quality report is held in S3002, selection of the antenna 12 is stopped, and the external antenna 13 is selected (S3003). Subsequently, a reception quality report when the antenna 11 and the external antenna 13 are used is held (S3004). After the reception quality report is held in S3004, selection of the external antenna 13 is stopped, and the external antenna 14 is selected (S3005). At this time, a reception quality report when the antenna 11 and the external antenna 14 are used is held (S3006). In this manner, all reception qualities corresponding to cases where any one of the antenna 12, the external antenna 13 and the external antenna 14 is used with the antenna 11 are detected, and a reception quality report showing those detection results is held. Thereafter, the reception quality reports are compared with one another. Then, an antenna with the best reception quality is determined in the antenna combinations with the antenna 11 based on the result of the comparison (S3007). Thereafter, an antenna to be used with the antenna 11 is selected (S3008 to S3010). After antenna selection is finished this way, the signal processing setting unit 64, for example, performs operational setting of the RF switch 4, the signal processing unit 5, the RF unit 31 and the RF unit 32 according to the selected antenna. As a result, signal processing for carrying out communication with the combination of the selected antennas is started (S3011).

Selecting a combination of antennas with low correlation based on the result of comparison of such reception quality reports can provide a satisfactory antenna configuration for spatial-multiplexing based communication. The reception quality report should show arbitrary measurements which can specify the DL channel characteristic, and may show, for example, signal to interference and noise ratio (SINR), the bit error ratio (BER), the energy per bit to noise power spectral density ratio (Eb/No) or the like.

Next, configuration examples and operational examples when a portable terminal device includes a sensor will be described. In the configuration examples shown in FIGS. 1A and 1B, the terminal 0 includes a sensor 8. The sensor 8 is, for example, an azimuth sensor using an acceleration sensor or the like, which can detect the inclination of the terminal 0. The sensor 8 may be provided as separate from the control unit 6 in the terminal 0, or may be provided inside the control unit 6 as part of the communication state detecting unit 62, for example. Further, the sensor 8 is not limited to the type which is incorporated in the terminal 0, and may be externally connected to the terminal 0 to transfer data indicative of the detection result to the control unit 6.

In this configuration example, the terminal 0 incorporates an antenna 15 and an antenna 16 in addition to the antenna 11 and the antenna 12. The antenna 15 and the antenna 16 are not limited to the type which is incorporated in the terminal 0, and, like the external antennas 13 and 14, may be configured as detachable external antennas. In addition, terminals 0 shown in FIGS. 11A and 11B each include a processing unit 50 which has all the functions of the foregoing RF units 31 and 32 and the signal processing unit 5. That is, the processing unit 50 can process signals of four lines (four high-frequency signals).

Figure 11A:
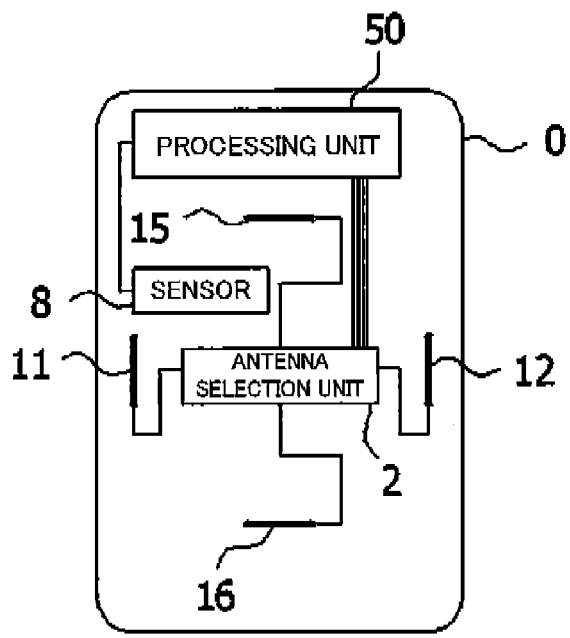
FIGS. 11A and 11B are diagrams each showing an example of the configuration of a terminal which is equipped with a sensor.

When the terminal 0 is placed in the direction as shown in FIG. 11A, the antenna 11 and the antenna 12 become antennas for vertical polarization, and the antenna 15 and the antenna 16 become antennas for horizontal polarization. As one example of the operation in this case, the combination of the antennas 11 and 12 provides an antenna configuration which maximizes the inter-antenna distance, has low correlation and is satisfactory for receiving vertical polarized signals.

Figure 11B:
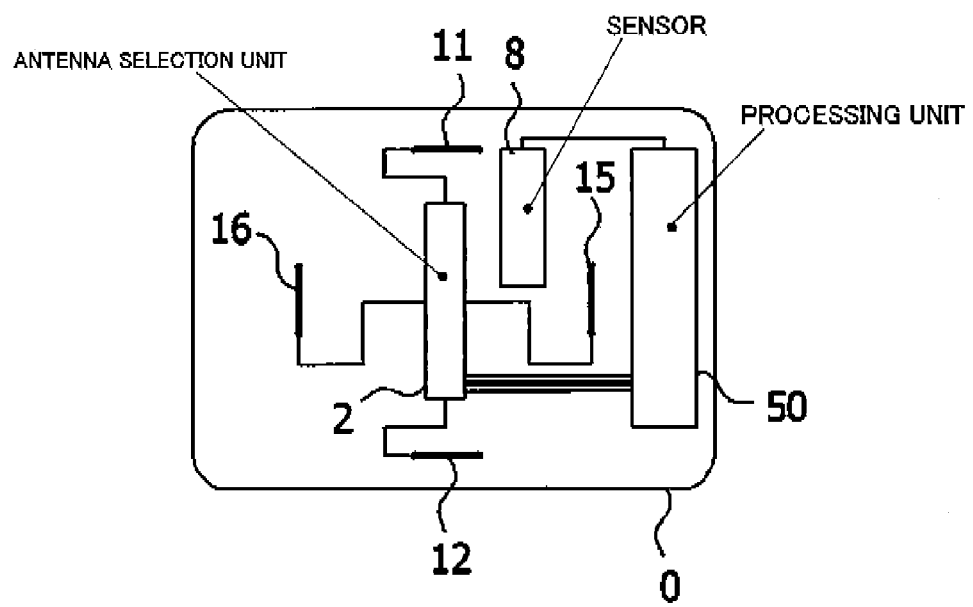

When the terminal 0 is tilted and placed in the direction as shown in FIG. 11B thereafter, the antenna 15 and the antenna 16 which have been horizontal become vertical to be able to receive vertical polarized signals. At the time the use of the terminal 0 views a streaming video, for example, the layout of the terminal 0 may be changed to change the screen direction from the vertical screen for selecting a program to the horizontal screen for viewing a video. At this time, the inclination of the terminal 0 is detected by the sensor 8, and when a certain or greater inclination is detected, the control unit 6 changes the antennas to be used. As one example, upon detection of a change of 45° or greater from the initial value (inclination angle) when the antenna configuration has been determined first, the antennas to be used should be changed to the antennas 15 and 16 from the antennas 11 and 12. Alternatively, the combination of antennas to be used may be changed according to whether the state of the terminal 0 in use is the vertical screen or the horizontal screen.

As apparent from the above, the antenna configuration can be changed so that the inclination of the terminal 0 is detected by the sensor 8 to always ensure reception of. The antenna configuration can be changed flexibly based on the result of detecting that the layout of the terminal 0 (position and direction, the state or the like) has been changed, thereby achieving satisfactory spatial-multiplexing based communication. The polarization direction of signals to be transmitted/received normally is not limited to the vertical direction, and may be a predetermined arbitrary direction such as the horizontal direction.

In the above example, the initial setting of the antenna configuration which has low correlation and can carry out satisfactory communication is set to the state where the antennas 11 and 12 for vertical polarization are selected for signal reception based on the inter-antenna distance. Alternatively, a combination of antennas which provides a satisfactory antenna configuration may be predicted and set so that, for example, the initial setting state is set to the state where the antenna 11 for vertical polarization and the antenna 15 for horizontal polarization are selected for signal reception based on the polarization directions of signals to be transmitted/received. Setting the combination of antennas to the initial setting state can shorten the set time at the time of activation or can ensure previous setting in consideration of the characteristic unique to the device.

The sensor 8 is not limited to the type which detects the inclination of the terminal 0, and may be of a type which can detect an arbitrary amount of variation in the communication environment of the terminal 0. As one specific example, a speed sensor for a vehicle, a range sensor therefor, or the like may be configured as an external sensor 8 and data indicative of the detection result may be transferred to the control unit 6 when the terminal 0 is mounted to the vehicle. The control unit 6 may execute a process of determining whether a predetermined amount of variation in the communication environment of the terminal 0 is equal to or less than a predetermined reference value, or is greater than the reference value. In addition, the setting of the cycle of changing the combination of antennas to be used may be varied according to whether the predetermined amount of variation in the communication environment of the terminal 0 has exceeded the reference value or not. For example, the control unit 6 should vary the setting of the cycle of executing the process as shown in, for example, FIG. 6, FIG. 9 or FIG. 10 according to whether the predetermined amount of variation in the communication environment of the terminal 0 has exceeded the reference value or not. That is, regardless of the case where the combination of antennas to be used is changed based on the physical configurations of the individual antennas, or the case where the combination of antennas to be used is changed based on the result of detecting the reception quality, the changing cycle should be varied according to a predetermined amount of variation in communication environment.

The following operation may take place as one example of such an operation of varying the cycle of changing the antenna configuration based on a predetermined amount of variation in communication environment. When the amount of variation detected is equal to or less than the reference value and there is a little change in communication environment, for example, the cycle of changing the antenna configuration is set to a predetermined first cycle. When the amount of variation detected exceeds the reference value to show a large change in communication environment, on the other hand, the cycle of changing the antenna configuration is set to a second cycle shorten than the first cycle. Accordingly, when there is a little change in the communication environment of the terminal 0 (e.g., when the moving speed of the terminal 0 is slow), the frequency of executing the process of changing the antenna configuration can be reduced to prevent the dissipation power from increasing. When there is a large change in the communication environment of the terminal 0 (e.g., when the moving speed of the terminal 0 is fast), the frequency of executing the process of changing the antenna configuration can be increased to quickly cope with the varying communication environment and change the antenna configuration, so that a satisfactory communication state can be maintained.

As one example of the operation of varying the cycle of changing the antenna configuration based on a predetermined amount of variation in communication environment, the amount of variation which has been detected regularly, for example, may be recorded, and the setting of the cycle of changing the antenna configuration may be varied according to the characteristic of the time-dependent change. When a time-dependent change in the amount of variation detected is equal to or less than the reference value and the communication environment is changing by substantially a constant change, for example, the cycle of changing the antenna configuration is set to a predetermined third cycle. When the time-dependent change in the amount of variation detected exceeds the reference value so that the communication environment is changing by a random change, on the other hand, the cycle of changing the antenna configuration is set to a fourth cycle longer than the third cycle. That is, when the time-dependent change in the amount of variation in the communication environment of the terminal 0 is large and the amount of variation in the moving distance, the moving direction or the like is changing at random, the frequency of executing the process of changing the antenna configuration is reduced. This can prevent frequent changes between specific (e.g., two or three) antenna configurations, such as the antenna configuration returning to the original antenna configuration after being changed to another antenna configuration, thus preventing an increase in dissipation power. When there is a little change in the amount of variation in the communication environment of the terminal 0 and the amount of variation in the moving distance, the moving direction or the like is changing substantially constantly, the frequency of executing the process of changing the antenna configuration is increased. This makes it possible to quickly cope with the varying communication environment and change the antenna configuration, thereby maintaining a satisfactory communication state.

According to the invention, as described above, when antennas whose quantity is equal to or less than the quantity of antennas of a base station to be communicated are selected to carry out spatial-multiplexing based communication, the setting is made to select a combination of antennas with low correlation, and stop power supply to the RF units which corresponds to the antennas which are not selected, thereby reducing the load on the signal processing unit. This makes it possible to change the antenna configuration to the one which can provide a satisfactory spatial-multiplexing based communication state while reducing the dissipation power, thereby improving the convenience (user-friendliness) and stability of the radio communication apparatus.

To select antennas with low correlation, a combination of antennas to be used should be selected based on the physical configurations of the individual antennas, as in the case of selecting a combination of antennas whose inter-antenna distance becomes maximum or the case of selecting a combination of antennas which transmit/receive radio signals whose polarization directions differ from one another. This can permit the antenna configuration to be changed flexibly and provide a satisfactory spatial-multiplexing based communication state. To specify a combination of antennas with low correlation according to the physical configurations of the individual antennas, the reference signal for measurement which has been transmitted from one antenna may be received at other antennas, and the level of receiving the reference signal, the phase thereof, the reception quality and the like may be measured.

A combination of antennas to be used may be changed based on the operational state of the radio communication apparatus, such as whether the amount of data to be communicated is large or small, or the remaining amount of the battery is large or small. This makes it possible to reduce the quantity of antennas to be used and the loads on the RF unit and the signal processing unit, thereby preventing the dissipation power from increasing, when the amount of data to be communicated is small, or when the remaining amount of the battery is small.

The invention is not limited to the foregoing embodiment, and various modifications and applications can be made thereto. For example, the foregoing description of the embodiment has been given of the case the RF unit 31 is enabled while the RF unit 32 is disabled when the quantity of antennas in a base station is two. However, the invention is not limited to this case, and even when the quantity of antennas in a base station is two, both of the RF units 31 and 32 may be enabled so that the RF unit 32 and the signal processing unit 5 ensure simultaneous use with another network system (e.g., UMTS, CDMA, HRPD, EvDO, GPS, or Bluetooth), monitoring, handover, or the like. To realize such an operation, the RF unit 31, the RF unit 32 and the signal processing unit 5 should be configured by a multi-mode IC capable of coping with plural types of network systems.

The following will describe connection to another network system. In this example, the terminal 0 uses the antenna 11, and selectively uses one of the antenna 12, the external antenna 13 and the external antenna 14. It is assumed that the combination of the antenna 11 and the antenna 12 is selected and data communication is carried out using the RF unit 31 and the signal processing unit 5. At this time, signal processing for executing communication in another network system is performed by the RF unit 32 or the like using the external antenna 13 and the external antenna 14 which are not unused.

As a specific example, the RF unit 32 may execute signal processing for malting a voice call using the CDMA. This can permit simultaneous execution of data communication using the LTE and a voice call using the CDMA, thus improving the convenience of the terminal 0. The RF unit 32 has two processing circuits which are capable of frequency-converting two high-frequency signals. When communication is feasible in another network system different from the LTE using only one processing circuit, an antenna (e.g., external antenna 14) whose inter-antenna distance becomes physically maximum as viewed from the antenna that is using the LTE should be selected as an antenna to be used Apparently, even when communication is carried out in a plurality of network systems, antennas with low correlation among the individual network systems are selected to minimize the influence on the communication in the network systems, thereby ensuring satisfactory communication.

Other network systems which are used with the LTE may be given priority levels, so that a network system to be used can be set properly according to various situations. Given that network systems to be used are set with different priority levels according to the time, place, moving speed, etc. beforehand, for example, it is possible to shorten the connection delay and stabilize communication. When using another network system significantly degrades the existing communication performance provided by the LTE, the procedure to connect to another network system may be interrupted.

When LTE-based communication is carried out with the combination of the antennas 11 and 12 selected, the external antenna 13 and the external antenna 14 which are not used, and the RF unit 32 may be used to acquire cell information needed to select a cell again. When the current cell registered in the terminal 0 is not optimal, it is necessary to select a cell again. In this case, various measurements and decisions on the states of peripheral cells are made so that a certain interruption time (delay time) is generated by re-establishment of a link, random access and the like. According to the LTE, when reselection of a cell is performed without the current cell's fulfilling a predetermined decision criterion, a maximum time of 100 ms is needed.

To cope with it, cell information needed for re-selection of a cell is acquired prior to the re-selection process, and the priority levels of cells are determined so as to shorten the time (interruption time) needed to resume communication through re-establishment of a link or the like. As one example, the priority levels of cells should be applied to re-selection of a cell using the RF unit 31 or the like while LTE-based communication is taking place. As another example, the communication operation may be changed over in such a way that communication is started using the RF unit 32 or the like according to the priority levels of cells based on the cell information acquired using the RF unit 32 or the like, and the operation of the RF unit 31 is stopped (disabled).

Figure 12:
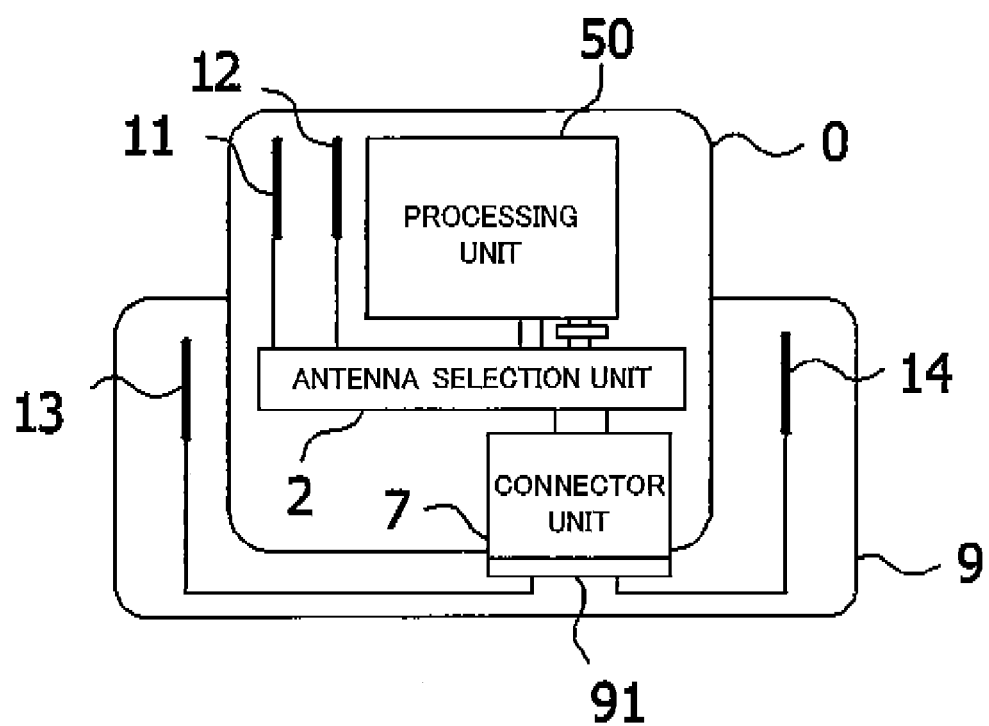
FIG. 12 is a diagram showing an example of the configuration of a cradle with built-in antennas.

The external antenna 13 and the external antenna 14 according to the foregoing embodiment need not be configured as dedicated external antennas, but may be mounted to, for example, a cradle 9 as shown in FIG. 12. The connection of the external antenna 13 or the external antenna 14 with the terminal 0 may be established when the terminal 0 is held into the cradle 9 which may be is used to charge and set the terminal 0 and perform communication therewith, e.g., when a connector 91 is fitted into the connector unit 7.

According to the embodiment, the terminal 0 has a 4-line configuration to be able to use four antennas at a maximum and have two 2-line RF units (RF unit 31 and RF unit 32). However, the invention is not limited to this configuration, and the maximum quantity of antennas and the number of lines of the transmission/reception circuits, the quantity thereof, and so forth can be optionally set according to the specifications for executing spatial-multiplexing based communication. For example, the terminal 0 may have an 8-line configuration including eight 1-line RF units, or an 8-line configuration including a single 8-line RF unit.

The invention can be worked out using a computer that controls not only a dedicated radio communication apparatus, but also an ordinary radio communication apparatus which performs spatial-multiplexing based communication. That is, a program for allowing the computer that controls a radio communication apparatus to function as the foregoing components to execute the foregoing processes may be recorded on a predetermined recording medium so that a microprocessor such as a CPU reads out and executes the program to allow the computer to function as the radio communication apparatus according to the embodiment. Such a program may be recorded in a computer readable recording medium, such as a FD, CD, DVD, MO or IC memory, for distribution. Further, the program may be stored in a file system included in an FTP (File Transfer Protocol) server or the like provided on an electric communication network such as the Internet, and may be downloaded into a computer in the form of a signal superimposed on a carrier wave.

Having described and illustrated the principles of this application by reference to one or more preferred embodiments, it should be apparent that the preferred embodiment(s) may be modified in arrangement and detail without departing from the principles disclosed herein and that it is intended that the application be construed as including all such modifications and variations insofar as they come within the spirit and scope of the subject matter disclosed herein.

What is claimed is:

1. A radio communication apparatus including an antenna set including a plurality of antennas and executing spatial-multiplexing based communication, comprising:
   an antenna selection unit that selects from the antennas a combination of antennas whose quantity is equal to or less than a quantity of counterpart antennas to be communicated, as a combination of antennas to be used in spatial-multiplexing based communication;
   a signal processing unit that executes signal processing for communication using the combination of antennas selected by the antenna selection unit;
   an antenna configuration specifying unit that specifies a physical configuration of the plurality of antennas; and a communication environment change detecting unit that detects a time-dependent change in a predetermined amount of variation in communication environment of the radio communication apparatus, wherein the antenna selection unit selects the combination of antennas to be used based on the configuration specified by the antenna configuration specifying unit, and varies a period of changing a combination of antennas to be selected, depending on whether the time-dependent change in the amount of variation detected by the communication environment change detecting unit is equal to or less than a predetermined reference value.

2. The radio communication apparatus according to claim 1, wherein the antenna configuration specifying unit specifies a physical inter-antenna distance as the physical configuration of the plurality of antennas, and the antenna selection unit selects a combination of antennas which maximizes the physical inter-antenna distance specified by the antenna configuration specifying unit.

3. The radio communication apparatus according to claim 1, wherein the antenna configuration specifying unit specifies a polarization direction of a radio signal to be transmitted/received by each antenna, and the antenna selection unit selects a combination of antennas with different polarization directions specified by the antenna configuration specifying unit.

4. The radio communication apparatus according to claim 1, wherein the signal processing unit includes a plurality of signal processing circuits that process signals to be transmitted/received in association with the plurality of antennas included in the antenna set, and power supply to one of the plurality of signal processing circuits which is not used is stopped based on the combination of antennas selected by the antenna selection unit.

5. The radio communication apparatus according to claim 1, wherein the signal processing unit includes a plurality of signal processing circuits that process signals to be transmitted/received in association with the plurality of antennas included in the antenna set, and a setting value for carrying out communication with the antennas to be communicated or another antenna to be communicated is acquired by using an antenna which is not selected by the antenna selection unit and a signal processing circuit which is associated with the antenna.

6. The radio communication apparatus according to claim 1, wherein the antenna set includes:

a first antenna set including a plurality of first antennas in which polarization directions of adjacent antennas are orthogonal to each other; and a second antenna set including a plurality of second antennas in which polarization directions of adjacent antennas are orthogonal to each other.

7. The radio communication apparatus according to claim 6, wherein the first antenna set or the second antenna set is configured to be dismountable from the radio communication apparatus, and wherein the radio communication apparatus further comprises a mount detection unit that detects if the first antenna set or the second antenna set is mounted to the radio communication apparatus.

8. The radio communication apparatus according to claim 1, wherein the antenna set includes:

a first antenna set including a plurality of first antennas, which make polarization directions of signals to be transmitted/received identical to each other; and a second antenna set including a plurality of second antennas, which make polarization directions of signals to be transmitted/received identical to each other, and the polarization direction of the signals to be transmitted/received by the plurality of first antennas is orthogonal to the polarization direction of the signals to be transmitted/received by the plurality of second antennas.

9. The radio communication apparatus according to claim 8, wherein the first antenna set or the second antenna set is configured to be dismountable from the radio communication apparatus, and wherein the radio communication apparatus further comprises a mount detection unit that detects if the first antenna set or the second antenna set is mounted to the radio communication apparatus.

10. The radio communication apparatus according to claim 1, wherein the antenna selection unit selects a combination of antennas in such a way as to always transmit/receive a signal having a certain polarization direction.

11. A radio communication apparatus including an antenna set including a plurality of antennas and executing spatial-multiplexing based communication, comprising:

antenna selection means that selects from the antennas a combination of antennas whose quantity is equal to or less than a quantity of counterpart antennas to be communicated, as a combination of antennas to be used in spatial-multiplexing based communication;

signal processing means that executes signal processing for communication using the combination of antennas selected by the antenna selection means;

antenna configuration specifying means that specifies a physical configuration of the plurality of antennas; and communication environment change detecting means that detects a time-dependent change in a predetermined amount of variation in communication environment of the radio communication apparatus, wherein the antenna selection means selects the combination of antennas to be used based on the configuration specified by the antenna configuration specifying means, and varies a period of changing a combination of antennas to be selected, depending on whether the time-dependent change in the amount of variation detected by the communication environment change detecting means is equal to or less than a predetermined reference value.

12. A radio communication method of executing spatial-multiplexing based communication using an antenna set including a plurality of antennas, comprising:

an antenna selection step of selecting from the antennas a combination of antennas whose quantity is equal to or less than a quantity of counterpart antennas to be communicated as a combination of antennas to be used in spatial-multiplexing based communication;

a signal processing step of executing signal processing for communication using the combination of antennas selected in the antenna selection step;

an antenna configuration specifying step of specifying a physical configuration of the plurality of antennas; and a communication environment change detecting step of detecting a time-dependent change in a predetermined amount of variation in radio communication environment, the antenna selection step selecting the combination of antennas to be used based on the configuration specified in the antenna configuration specifying step, and varying a period of changing a combination of antennas to be selected, depending on whether the time-dependent change in the amount of variation detected in the communication environment change detecting step is equal to or less than a predetermined reference value.

13. A non-transitory computer readable medium storing a program allowing a computer that controls a radio communication apparatus which executes spatial-multiplexing based communication using an antenna set including a plurality of antennas, to function as:

an antenna configuration specifying unit that specifies a physical configuration of the plurality of antennas;

an antenna selection unit that selects from the antennas a combination of antennas whose quantity is equal to or less than a quantity of counterpart antennas to be communicated, as a combination of antennas to be used in spatial-multiplexing based communication, based on the configuration specified by the antenna configuration specifying unit;

a signal processing unit that executes signal processing for communication using the combination of antennas selected by the antenna selection unit; and a communication environment change detecting unit that detects a time-dependent change in a predetermined amount of variation in communication environment of the radio communication apparatus, wherein the antenna selection unit varies a period of changing a combination of antennas to be selected, depending on whether the time-dependent change in the amount of variation detected by the communication environment change detecting unit is equal to or less than a predetermined reference value.

* * * * *